United States Patent [19]

Timm

[11] Patent Number: 5,067,395

[45] Date of Patent: Nov. 26, 1991

[54] DEVICE FOR PREPARING HOT DRINKS

[76] Inventor: Eberhard Timm, Rahheideweg 15, D-2114 Appel, Fed. Rep. of Germany

[21] Appl. No.: 475,682

[22] Filed: Feb. 6, 1990

[30] Foreign Application Priority Data

Feb. 9, 1989 [DE] Fed. Rep. of Germany ....... 3903815
Mar. 3, 1989 [DE] Fed. Rep. of Germany ... 8902598[U]

[51] Int. Cl.$^5$ .................. A47J 31/10; A47J 31/30; A23F 5/26
[52] U.S. Cl. ...................... 99/282; 99/288; 99/297; 99/299; 99/319
[58] Field of Search .............. 99/279, 280, 281, 282, 99/283, 316, 317, 299, 318, 319, 295, 297, 322

[56] References Cited

U.S. PATENT DOCUMENTS

| 2,029,596 | 2/1936 | Smith | 99/282 |
|---|---|---|---|
| 2,230,304 | 2/1941 | Locke | 99/282 |
| 2,292,853 | 8/1942 | Wilcox | 99/282 |
| 2,498,386 | 2/1950 | Alexander | 99/282 |
| 2,856,843 | 10/1958 | Miklas | 99/282 |
| 3,011,427 | 12/1961 | Okie | 99/283 |
| 3,179,035 | 4/1965 | Lockett | 99/282 |
| 3,396,653 | 8/1968 | Rutherford | 99/282 |
| 3,422,745 | 12/1969 | Eisendrath | 99/282 |
| 3,423,209 | 12/1969 | Weber | 99/282 |
| 4,167,899 | 9/1979 | McCormick | 31/57 |
| 4,577,080 | 3/1986 | Grossman | 6/80 |
| 4,667,584 | 5/1987 | Koyama et al. | 99/280 |

FOREIGN PATENT DOCUMENTS

| 512276 | 11/1930 | Fed. Rep. of Germany | 34/7 |
|---|---|---|---|
| 1166949 | 3/1963 | Fed. Rep. of Germany | 3/02 |
| 1554630 | 1/1966 | Fed. Rep. of Germany | 31/56 |
| 2244716 | 9/1972 | Fed. Rep. of Germany | 25/2 |
| 2622216 | 5/1976 | Fed. Rep. of Germany | 31/10 |
| 1483269 | 6/1966 | France | |
| 2579090 | 3/1985 | France | 31/40 |

Primary Examiner—William A. Cuchlinski, Jr.
Assistant Examiner—John L. Beres
Attorney, Agent, or Firm—Hayes & Reinsmith

[57] ABSTRACT

A device for preparing hot drinks is disclosed having a liquid-storage vessel 3, an electric heating element 14 arranged therein, a current supply circuit 17 and a collecting vessel 1 for the prepared drink. This device can be used very advantageously, particularly in vehicles. It is characterized in that the storage vessel 3 is designed as a unit separate from the current supply circuit 17 and closed by valve 10-13 which opens irreversibly at a predetermined pressure inside the storage vessel 3, and is provided with contacts 16 for the supply of electrical current which are connected to the heating element 14 via an electric line 15 which is interrupted when the valve 10-13 is opened. The storage vessel 3 is insertable into the collecting vessel 1 in such a way that in an operative position of the storage vessel 3, a collecting space of the collecting vessel 1 is situated essentially below the storage vessel 3.

22 Claims, 9 Drawing Sheets

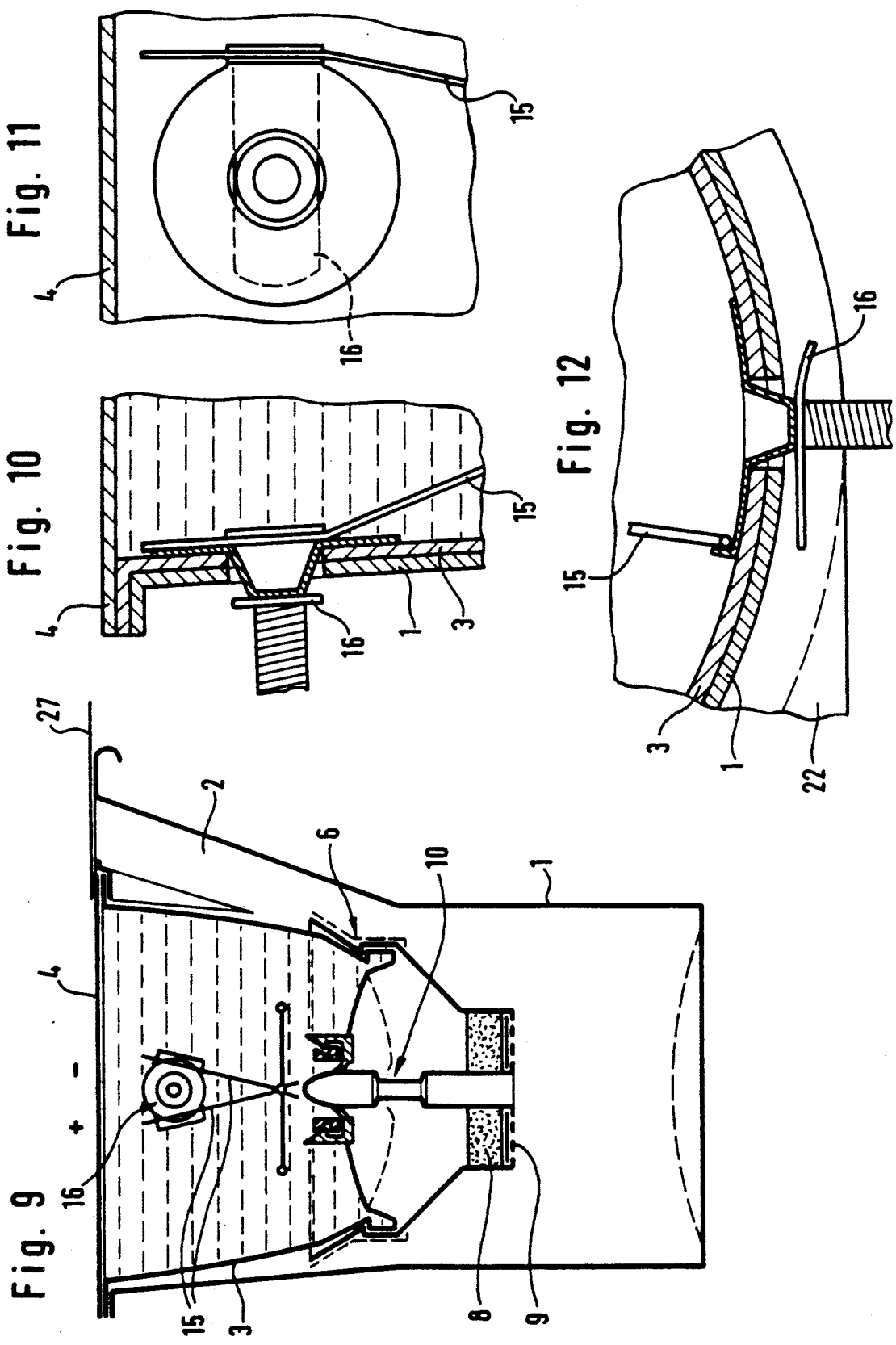

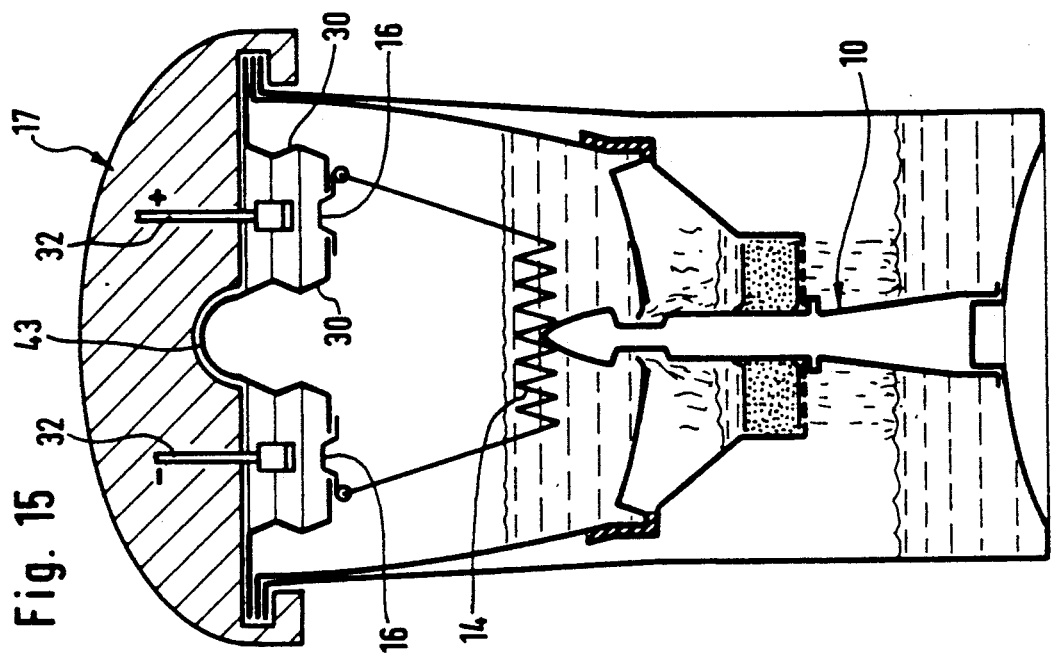
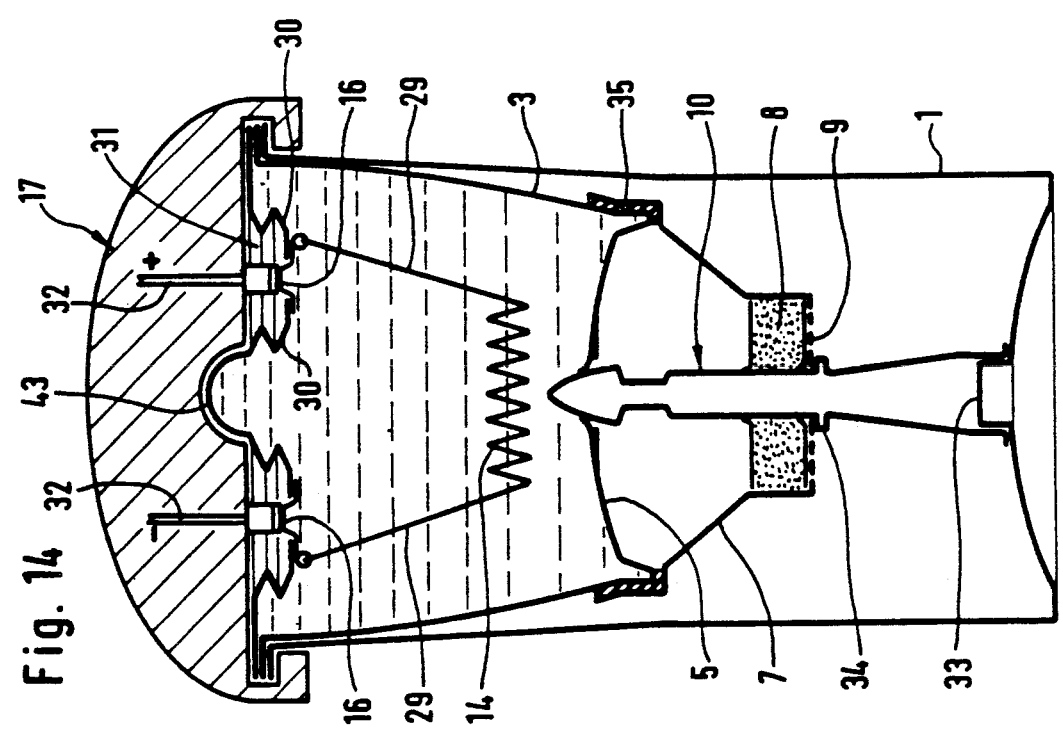

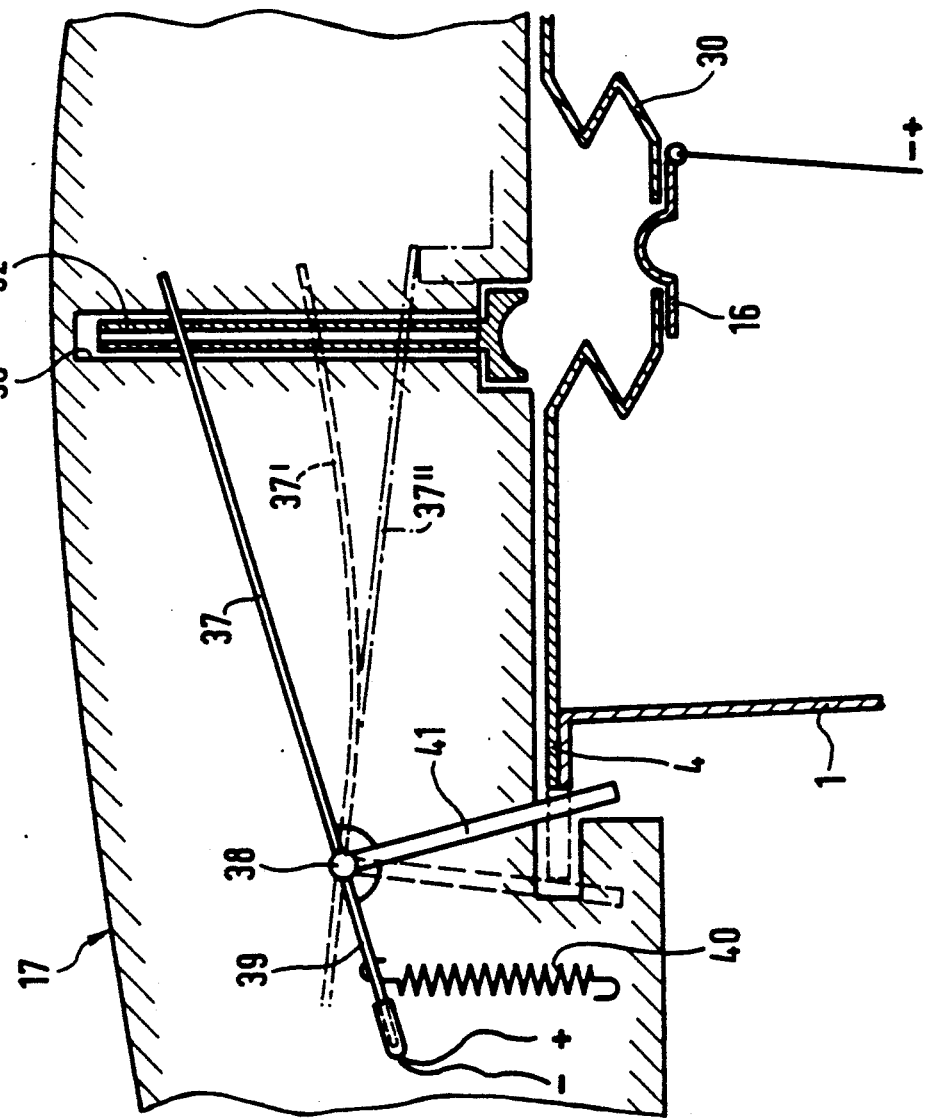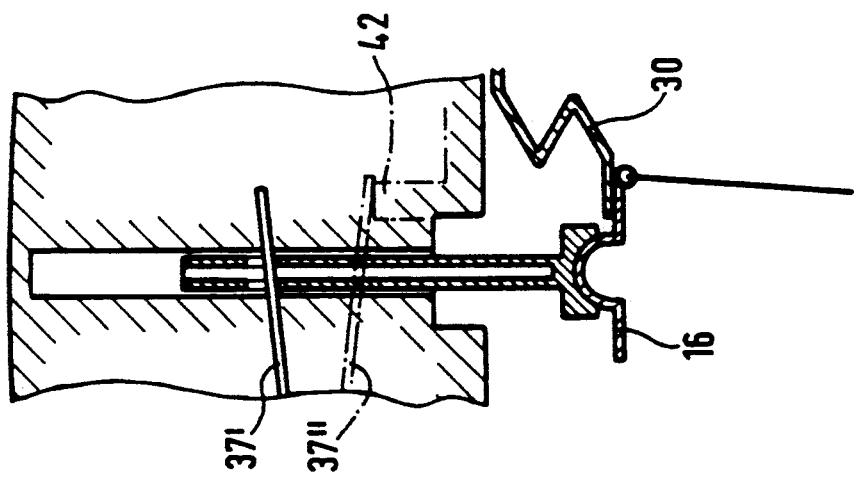

DEVICE FOR PREPARING HOT DRINKS

FIELD OF THE INVENTION

The invention relates to a device for preparing hot drinks having a liquid-storage vessel, an electric heating element arranged therein, a current supply circuit and a collecting vessel for the prepared drink.

BACKGROUND OF THE INVENTION

Devices of this type are very widespread, for example in the form of coffee machines. The disadvantage of these coffee machines and similar devices of the type mentioned at the beginning is that the preparation of the drinks is very complicated as water or another liquid and an infusion or concentrate must be introduced into the device separately and in portions. These devices have the further disadvantage that they have many components which need to be cleaned. Lastly, these devices are unsuitable for use in cars, aeroplanes etc. as they take up a lot a room and the liquid may splash out when the vehicle moves. In addition, when in travel there is often no available source for suitable liquids, mostly water.

OBJECT OF THE INVENTION

The object of the invention is to provide a device of the type mentioned at the beginning which can be used very simply and advantageously even in travel.

SUMMARY OF THE INVENTION

The solution according to the invention consists in that the liquid-supply vessel is designed as a unit separate from the current supply circuit and closed by a valve which opens irreversibly at a predetermined pressure inside the vessel, is provided with contacts for the supply of electrical current which are connected to the heating element via an electric line, and is or can be inserted into the collecting vessel in such a way that in the operative position the collecting space is situated essentially below the storage vessel, and that the current feed to the heating element is designed such that it is interrupted when the valve opens.

GENERAL DESCRIPTION O THE INVENTION

The device thus exhibits a liquid-storage vessel which is closed. In this way, in the form of the liquid storage vessel portioned quantities of the liquid are simultaneously available when several such liquid-storage vessels are brought along. The liquid can in this connection be water or, for example, milk or another liquid. The liquid can also be present in frozen form, in particular when it does not keep well, such as for example milk. The liquid-storage vessel is not provided fixed to a current supply but has contacts for the supply of electrical current. In order to heat up the liquid, the storage vessel may then be connected to a current supply, for example inserted into a corresponding supply unit which is joined to corresponding electrical contacts and connected to an energy source, for example the 6-volt, 12-volt or 24-volt battery of a vehicle.

The liquid-storage vessel is first closed by the valve. If the liquid-storage vessel is connected to the electrical energy supply and as a result heats up the liquid, the internal pressure rises correspondingly as the liquid and any volume of gas contained heat up and gases dissolved in the water such as, for example, oxygen and carbon dioxide leave the liquid in the form of bubbles and as a result also increase the pressure. At a predetermined internal pressure, in other words when the liquid has reached the temperature required according to the invention, the valve opens irreversibly, and liquid flows out. Since the opening process is irreversible, the valve does not close again afterwards, so that all the liquid flows out through the valve, even after the internal pressure has resumed the normal value by the opening of the valve.

Simultaneously, with the opening of the valve the current connection to the heating element is permanently interrupted so that the vessel cannot be damaged here by it being further heated up when it is empty as well.

In the operative position, the collecting vessel, into which the liquid flows, is situated below the liquid vessel. The liquid can then be removed from this collecting vessel, for example it can be drunk.

The dry substances of a soup to be made up could, for example, be arranged in the collecting vessel.

In many cases, however, it would be desirable to introduce a concentrate-dissolving or infusion process where the concentrate or infusion does not enter the collecting vessel, for example with coffee or tea. In this case, it is advantageously provided for a storage space, closed by a sieve or filter, to be provided for a concentrate or infusion in the operative position below the valve. The concentrate or infusion is then advantageously fastened in the lower region of the storage space, which can, for example, be achieved by enclosing the concentrate or infusion not only from below by the filter or the sieve, but also by a corresponding filter plate or the like arranged on top of it. It may, however, also be provided for the concentrate or infusion to be arranged in a foil bag, also situated in the storage space, which can be destroyed under the action of heat. This foil bag then bursts open under the action of the hot liquid, the filter or sieve preventing it from entering into the collecting vessel. Such bags formed from foil are advantageous in particular for liquid concentrates or infusions, for example when making grog, mulled wine or the like.

An especially space-saving embodiment is characterized in that the collecting vessel completely encloses the storage vessel in the operative position laterally and from below, it being possible for collecting vessel and storage vessel to be joined firmly together beforehand as well.

In this embodiment, it is advantageously provided that the collecting vessel is provided with a lateral tubular channel for removing the drink. Through this lateral channel, the drink may then, for example, be drunk directly or it may at the opening of the channel pass into a drinking aid such as, for example, a straw or a teat. In this case, seals can be provided either in the drinking aid or in the opening of the removal channel, so that no liquid can escape between drinking aid and opening.

If the components consisting of storage vessel and collecting vessel, as well as heating etc., are delivered as a compact vessel unit, the opening of the removal channel is advantageously closed with a film which can be torn off. In this case, not only the liquid, but also the concentrate or infusion is hermetically sealed before the liquid is heated up or before the heated drink is tasted. In particular, in this way it is impossible for the collecting vessel to become contaminated.

In particular with the vessel unit already mentioned, it is advantageous if this unit is provided with a flange projecting laterally upwards in the operative position before insertion into a current supply unit and for securing in the same.

The vessel unit is advantageously provided with upper contacts it being more advantageous for many applications, however, if the vessel unit is provided with lateral contacts The support and current supply unit may in particular be designed to be capable of being folded so that they can be folded away when not in use, thus saving space. In addition, they may be provided with a light source in order, for example, to facilitate insertion of the vessel unit. The support, however, may also be arranged in a stationary manner, for example in vending machines. It can also be designed such that it can be inserted into a corresponding recess of a wall or sunk in some other way.

It has proven to be specially advantageous if the valve has a cylindrical element which is surrounded by an annular seal of the bottom of the storage vessel and in the operative position has a region with a smaller diameter, the storage vessel being designed such that its bottom moves downwards with increasing pressure. This valve works in such a way that with the valve open the storage vessel is turned upside down and the liquid poured in. The arched bottom is then pressed inwards counter to its pretension; in this position it snaps into place, the seal then coming into contact with the region with a larger diameter of the cylinder and in this position sealing hermetically. If the internal pressure rises as a result of heating up, the bottom is gradually pressed out again. In a certain position, it will then suddenly bulge out downwards completely as a result of its pretension, the arrangement then being such that the seal enters the region with a smaller diameter of the cylindrical element. At this point it is no longer capable of sealing so that the liquid may flow out through the valve as desired.

In another embodiment, although the bottom is rigid, the side wall of the storage vessel is, however, provided with an annular, bellows-like region which is also pretensioned towards a position where the bottom is pressed relatively far downwards. The filling of the storage vessel takes place with an underpressure so that the closed vessel as a result of its underpressure occupies a position in which the bottom assumes an upper position. When the liquid is heated up, the bottom has a corresponding tendency to move downwards, in which, however, it is obstructed by the friction at the mentioned valve. Only when the pressure is sufficiently great and consequently when the temperature is sufficiently high, does the bottom move downwards, with the valve then open, the now expanded bellows pressing the bottom downwards so that the valve remains in the open position.

It is advantageously provided that the current line from the contact to the heating element has outwardly pretensioned spring elements, which, when the bottom is moving downwards, can be released into a position in which the connection is interrupted.

The contacts of the vessel can, however, also be designed and arranged in such a way that the current connection between the contact elements of the support and the contacts which are arranged on the vessel is interrupted. For this purpose, the contacts can be arranged in bellows-like recesses of the vessel and move inwards when an initial overpressure decreases. This is achieved by the fact that although the bellows of the recess have a tendency to press the contacts inwards, they are nevertheless prevented from doing so by the internal pressure of the vessel which is filled with an overpressure. If the overpressure is further increased as a result of the heating process, so that the valve opens and that the overpressure is cancelled, then the contacts move inwards as a result of the movement of the bellowslike walls, so that there is no longer any electrical contact with the current supply.

The recesses for the contacts are advantageously arranged on the cover and interact with spring-loaded contact elements of the current supply circuit which are provided with a mechanical stop to limit their movement towards the inside of the vessel so that these movable contact elements can follow the vessel contacts for only a certain distance with the result that the contact is interrupted here.

The contact elements can be mounted on a lever which has a movable stop for the vessel edge. In this case, the initially withdrawn contact elements are made to touch the contacts as a result of the insertion of the vessel into the recesses via the action of the lever. When the vessel is subsequently extracted, the contact elements of the current supply circuit then move upwards again so that the extraction of the vessel is not prevented. It is advantageous especially in this embodiment if the support has an elastically expandable catch device for the vessel so that the vessel is not pushed out of the current supply circuit as a result of the spring force of the movable stop.

The contacts themselves can, for example, be sealing rivets which traverse the vessel wall. It has, however, proven to be especially advantageous to produce the contacts from metal plates which are deformed in the central region in the shape of pots, an edge region being left over which bears tightly against the vessel wall, only the end surface of the pot-shaped region traversing the vessel wall in order to make contact with contacts of the current supply situated there.

The storage vessel must, of course, be sufficiently stable that only its bottom is essentially deformed. It will normally have a cylindrical side wall which can withstand high pressures. The cover will be more or less flat. A corresponding support surface can, however, be provided here in the current supply unit, against which the cover surface of the vessel can be supported when the internal pressure increases.

In an advantageous embodiment, an at least partially detachable connection is provided between liquid-storage vessel and collecting vessel, for example a parting line with a tear-off strip. After the drink or the soup has been prepared, this strip can be torn off so that the storage vessel can be folded away so that the soup or the drink can be drunk better. The storage vessel can then be subsequently folded onto the vessel so that there are no open surfaces contaminated by food or liquid residues. The storage vessel could, however, also be joined to the collecting vessel in such a way that it can be completely separated from the storage vessel.

BRIEF DESCRIPTION OF THE DRAWINGS

The invention will be described below in connection with advantageous embodiments with reference to the attached drawings, in which:

FIGS. 9 to 12 show an especially advantageous form of a contact in a view similar to that in FIG. 1 in a horizontal section, and in internal and horizontal sectional plan view;

FIGS. 14 and 15 show another embodiment of the vessel in section;

.FIG. 16 shows a section through the current supply circuit with movable contact elements;

FIG. 17 shows a detailed representation of the contact element in FIG. 16 in another position.

DETAILED DESCRIPTION OF PREFERRED EMBODIMENTS

Figure 1:
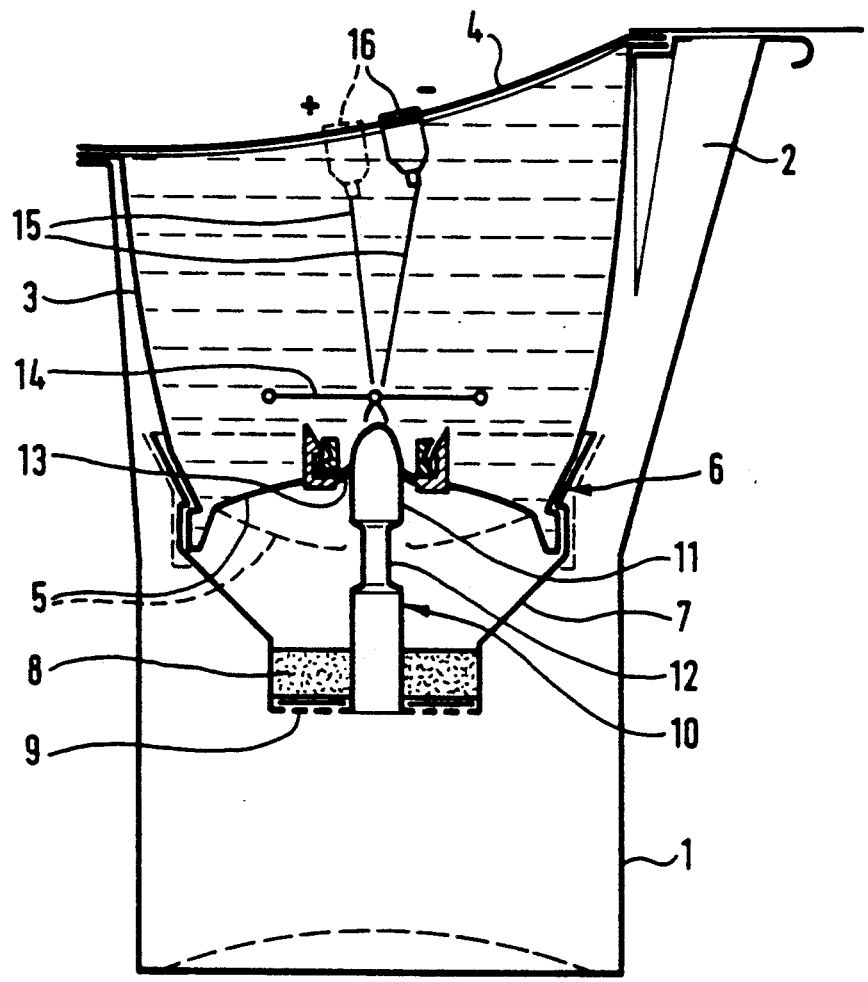
FIG. 1 shows an embodiment of the invention in a vertical section.

As shown in FIG. 1, a storage vessel 3, which is filled with a liquid, is situated in a collecting vessel 1 which is provided with a lateral outlet channel 2. The vessels have an essentially cylindrical shape and are sealed by a cover 4. The bottom 5 of the storage vessel 3 is arched and pretensioned such that it assumes the convex shape drawn with dashed lines in FIG. 1. Another vessel 7, which contains the concentrate or infusion 8 in a lower annular region, is placed onto the storage vessel 3 with the aid of a snap-catch connection 6. The vessel 7 exhibits a sieve or a filter 9 below the substance 8. The substance 8 can also be fastened from above through a sieve or a filter.

The vessel 7 exhibits centrally and axially a cylindrical spike 10 which has an essentially larger thickness in the upper region (at 11) than in a central region 12. The vessel bottom 5 is sealed against the thicker region 11 of the spike 10 with the aid of a lip seal 13. An electrical heating element 14 in the form of a resistance wire, which is connected to contacts 16 via contact springs 15, is situated above the vessel bottom.

Figure 2:
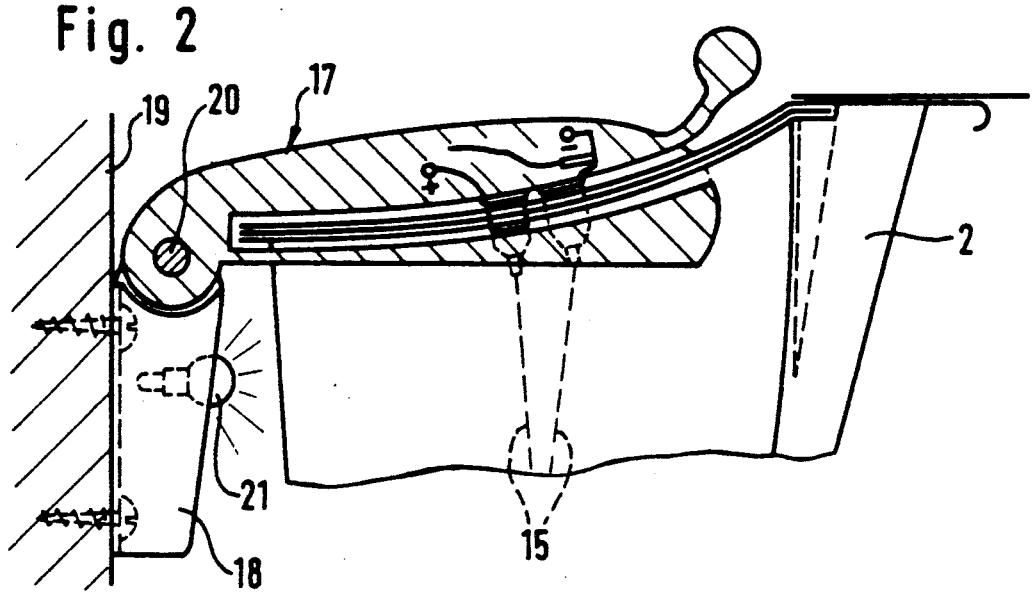
FIG. 2 shows the vessel unit in FIG. 1, which has been inserted into a support with a current supply, in a detailed view.
Figure 3:
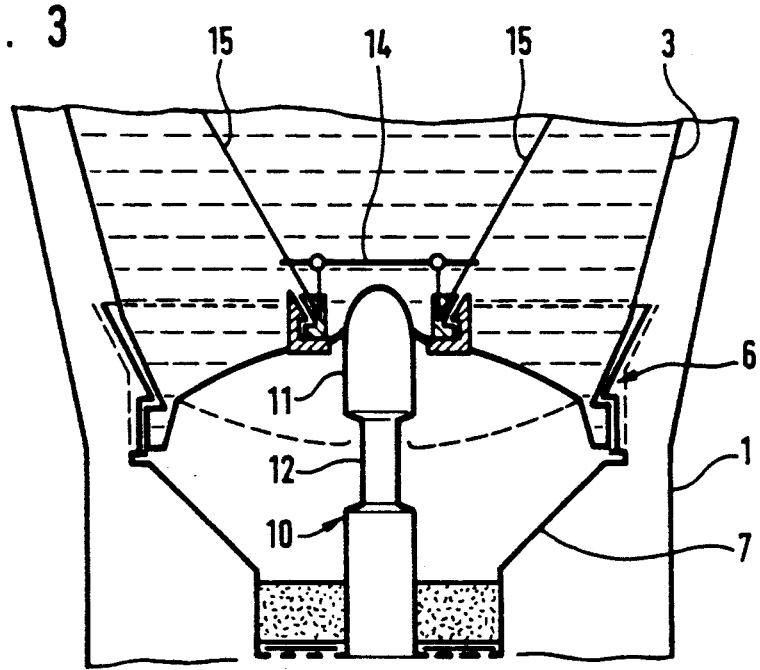
FIG. 3 shows the vessel in FIG. 2, in a position rotated by 90° as compared with FIG. 1, in a detailed view.

As shown in FIG. 2, the vessel can be inserted into a current supply circuit 17 which is fastened to a wall 19 with a fastening part 18, the current supply circuit 17, which can be connected to a battery or another power supply, being pivotable about an axle 20 and exhibiting an illumination device 21.

The filling of the vessel takes place as follows. The bottom 5 initially has the form shown in dashed lines so that the lip seal 13 does not seal against the thinner region 12 of the spike 10. In this position, the vessel is turned upside down and filled. The bottom 5 is subsequently pressed inwards into the position shown in the Figure with solid lines, in which it remains. In this case, the vessel is closed by the lip seal 13 which now bears against the thicker spike section 11. The lower vessel 7 with the concentrates or infusions is subsequently placed on the vessel 3. A foil bag with, for example, liquid concentrates can be included in the space of the vessel 7 instead of the solid concentrates 8 shown. The vessel 3 is then subsequently placed in the collecting vessel 1 and permanently fastened there, unless it is preferred to deliver and keep the storage vessel 3 with liquid and concentrate separate from the vessel 1, which has the advantage that only one or a few vessels 1 can be used over and over again.

Figure 4:
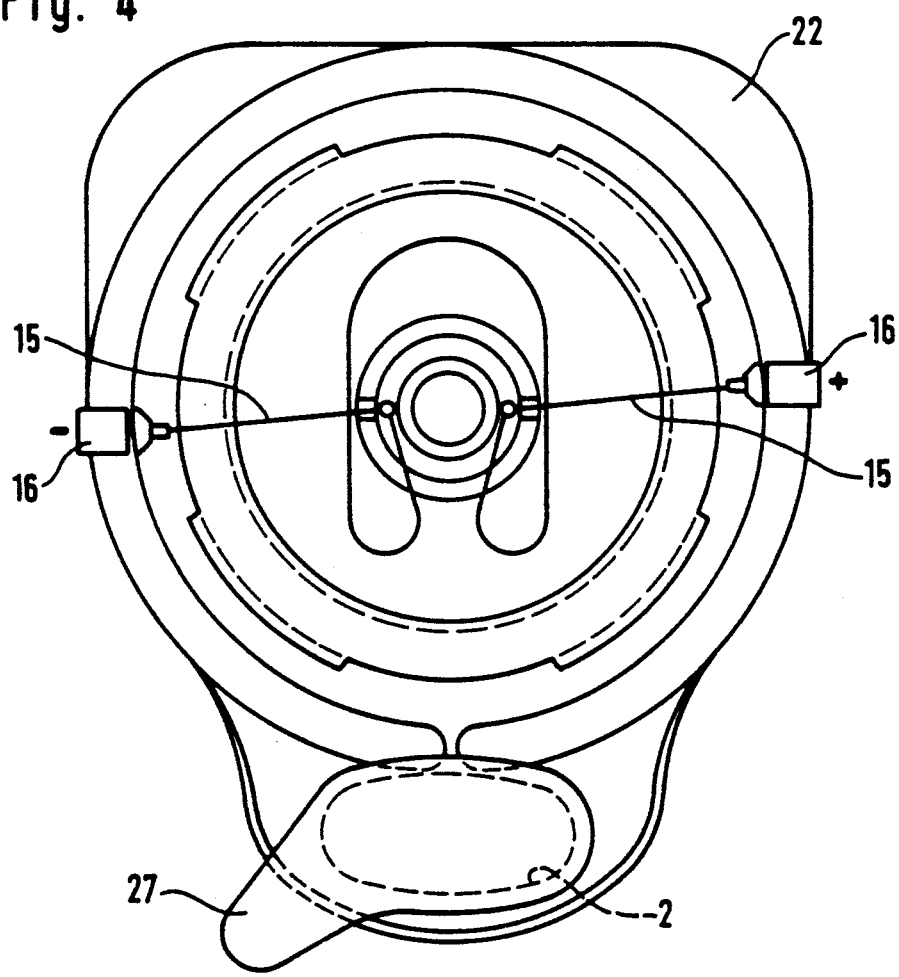
FIG. 4 shows the partially open vessel in plan view.

As shown in FIG. 4, the vessel 1 is provided at its upper edge with a flange 22 with which it can be inserted into the current supply circuit 17 and secured there. In the embodiment in FIGS. 1 and 2, the cover 4 is curved, which prevents the vessel from falling out of the current supply circuit 17. The cover could, however, also take a flat shape, which would be advantageous in particular for automatic appliances.

Figure 5:
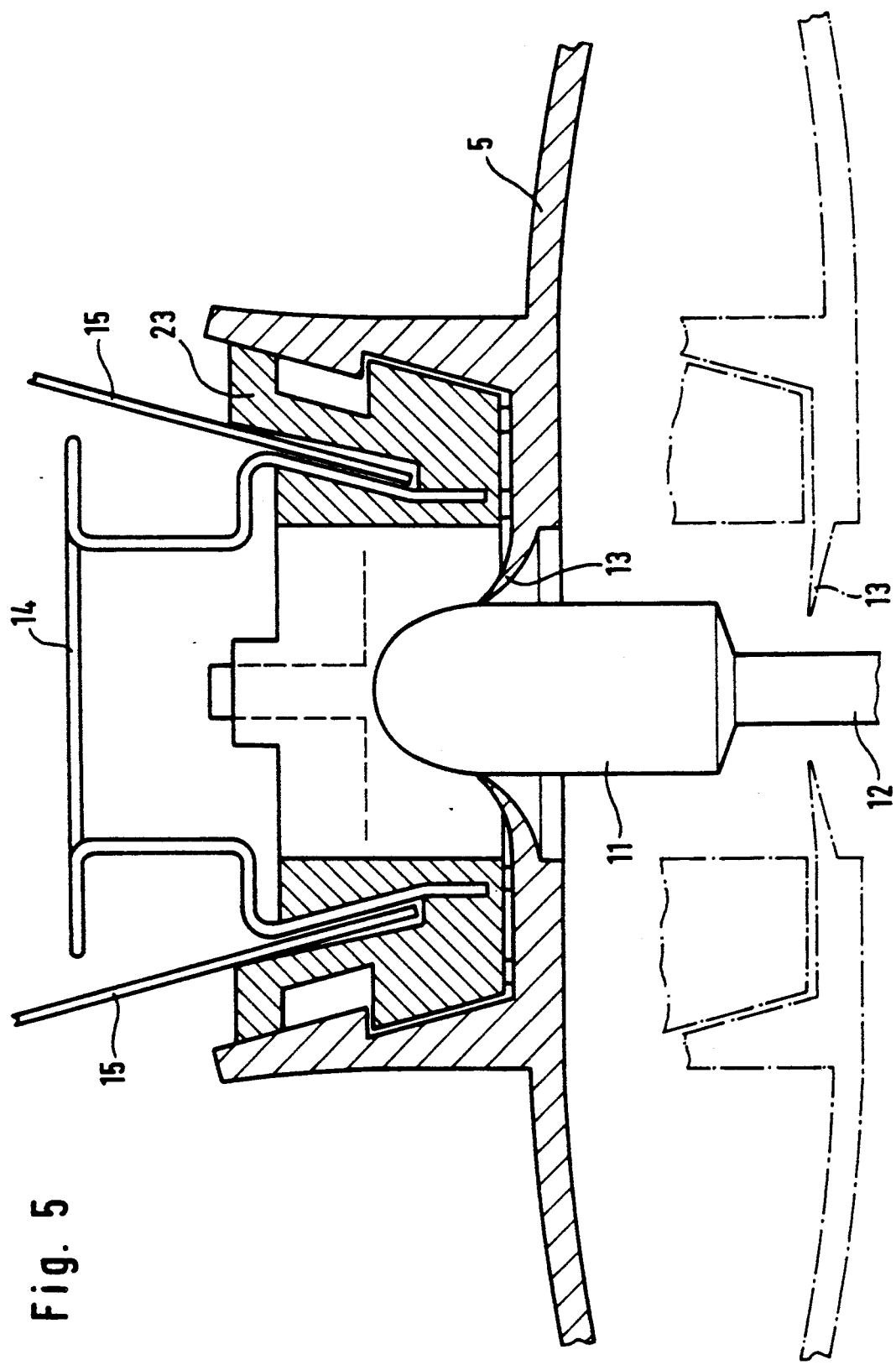
FIG. 5 shows the opening movement of the valve in two different movement stages.

At the top in FIG. 5, the condition is shown in which the valve is closed, when the bottom 5 is situated in the upper position. In this case, the lines 15 are in electrical contact with the heating element 14. For this purpose, corresponding slots are provided in an element 23 attached via a snap joint. The lines 15 here take the form of springs which are outwardly loaded. In the upper position, the seal 13 forms a tight closure against the thickened cylinder section 11. When the pressure rises, the floor will, after having surmounted the neutral position as a result of the pretension, fold downwards, so that on the one hand the sealing lips 13 no longer bear against the central spike since they are now situated in the thinner region 12. On the other hand, however, the contact springs 15 are no longer prevented by the body 23 from moving outwardly so that they spring away outwardly, the contact with the heating element 14 ceasing as a result. The liquid can now run out through the valve, it being possible also for an exchange of air to take place laterally through the element 23 so that no liquid is retained in the storage vessel as a result of an underpressure.

Figure 6:
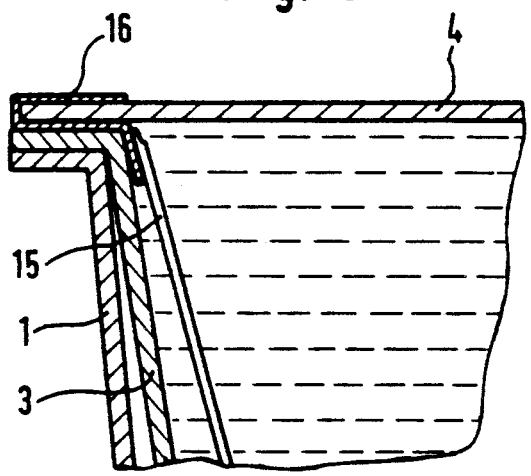
FIG. 6 shows a design of the contact for the vessel unit.
Figure 7:
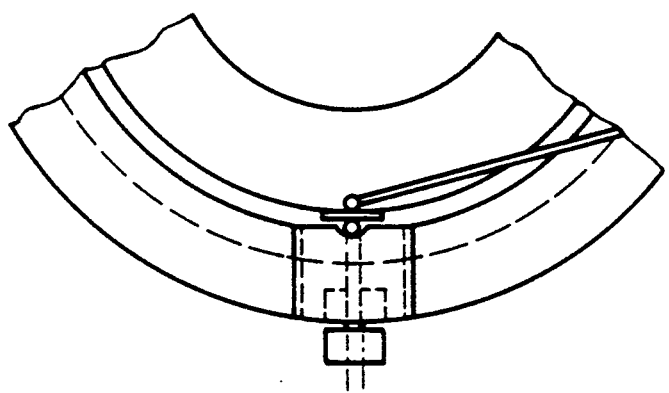
FIG. 7 shows another design of the contact.

Other forms of the contacts with which the vessel unit is to be supplied with current are shown in FIGS. 6 and 7. Since the lines 15 are situated in the liquid and have a larger cross-section than the heating element, only very little heat is passed to the contacts 16, and hence to the vessel wall.

Figure 8:
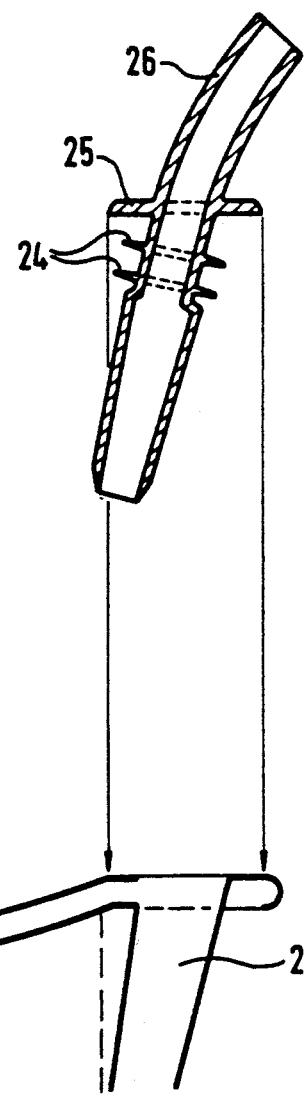
FIG. 8 shows a drinking aid to be used in conjunction with the vessel.

FIG. 8 represents how a drinking aid in the form of a drinking straw, which is provided with lip seals 24 and a cover element 25, can be introduced into the opening of the removal channel 2 so that the drinking aid 26 bears tightly against the opening of the removal channel 2. Before use of the vessel, this opening is closed with a film 27 which is shown in FIG. 4.

A contact 16 is shown in FIGS. 9 to 12 which is produced from a small plate by stamping and has a central cup-shaped region with which the contact is made, while an edge region adjoins the inside of the vessel. The illustrations show the arrangement in cross-section, in longitudinal section, in a view from inside and in horizontal section.

Figure 13:
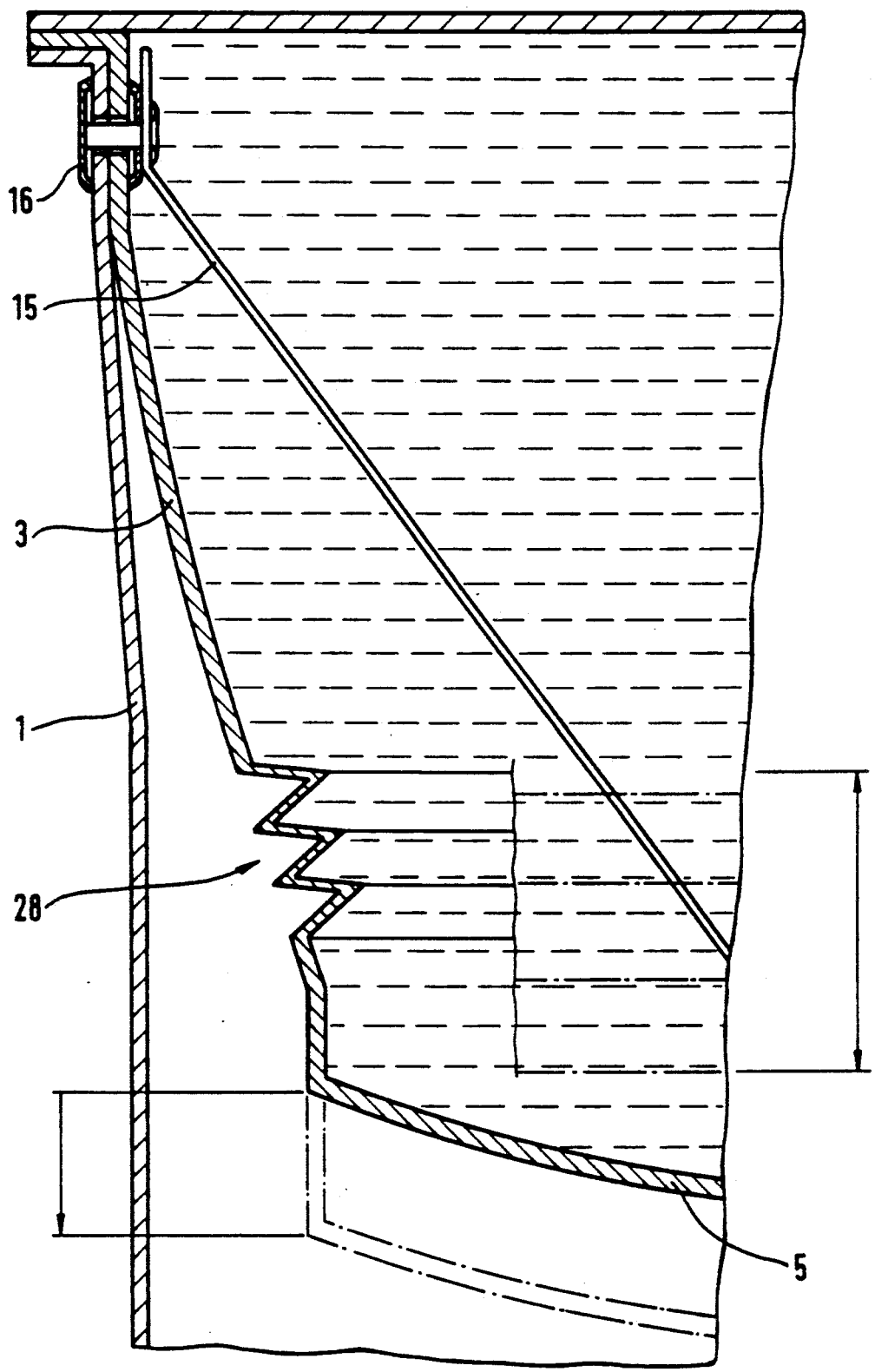
FIG. 13 shows another embodiment of the storage vessel and the contact.

FIG. 13 shows a detailed view of an embodiment in which the bottom 5 is, as opposed to the embodiments previously mentioned, rigid. An annular bellows-like region 28, which is pretensioned such that it tends to press the bottom 5 downwards into the position shown in dashed lines, is, however, provided laterally on the wall of the storage vessel 3. The vessel is filled with an underpressure so that the bellows-like region 28 is compressed. During the heating up, the bottom is then pressed downwards, the bellows-like region 28 extending. After surmounting the friction at the valve 10-13, the bottom or the valve then jumps permanently into the open position as a result of the pretension.

Another embodiment of the vessel is shown in FIGS. 14 and 15. There the contacts 16 are joined to the heating element 14 via fixed lines 29, it being possible for the contact element to be secured by the lines 29 alone so that it can hang free in the vessel 3. There is no need for special retaining elements for the heating element 14, which makes production more economical. The vessel is filled with an overpressure so that bellowslike side walls 30 of recesses 31, in the bottom of which the contacts 16 are arranged, are compressed. In this position, the contacts 16 touch contact elements 32 of the current supply circuit 17 so that the vessel contents can be heated up.

When, as shown in FIG. 15, the valve 10-13 has opened, an overpressure no longer prevails in the vessel 3 and the bellows-like walls 30 move downwards, the contact between the contact elements 32 of the current supply circuit 17 and the contact 16 of the vessel being interrupted as a result.

In this embodiment, the spike 10 extends as far as the bottom of the outer vessel 1 and is secured there by a projection 33. At approximately half its height, it has a collar 34 by means of which the other vessel 7 is pressed upwards, so that it cannot be detached from the liquid-storage vessel 3. A simple sealing means 35 is arranged between vessel wall 3 and wall of the vessel 7. No such expensive snap-catch joint or similar joint is required here, as in the embodiment in FIG. 1.

The contact elements 32 of the current supply circuit 17 have a punch-shaped design and are contained sliding in corresponding bores 36, as shown in FIGS. 16 and 17. A resilient arm 37, which is pivotably mounted at 38, passes through the contact element 32. The lever 37 is here elongated at 39 beyond the pivot 38. This lever arm 39 is attached to an extension spring 40 which pretensions the lever 37 in an anticlockwise direction so that the contact element 32 is normally withdrawn into the support 17 so that the vessel can be inserted into the current supply circuit 17 without hindrance The levers 37, 39 are also fastened to a movable stop 41 which, when the vessel 1 is inserted in FIG. 16, pivots in a clockwise direction so that the spring-loaded lever 37 presses the contact element 32 downwards until the lever 37 assumes the position which is indicated at 37' in FIGS. 16 and 17. In this position, the lever 37 presses the contact element 32 against the contact 16 and thus makes the electrical connection. When the bellows-like region 30 moves downwards, the arm 37 rotates further in a clockwise direction until it assumes the position 37" in which it touches the stop 42. From this moment on the contact element 32 is unable to follow the contact 16 further so that the electrical connection is permanently interrupted. When the cup 1 is subsequently removed, the force acting on the lever 41 stops so that the contact element 32 can be moved back again into the position in FIG. 16 and the cup removed from the current supply circuit 17.

To make it impossible for the cup 1 to be removed from the current supply circuit 17 via the spring-loaded lever 41, a spring-loaded catch device, not shown in the figures, is provided to secure the cup in the inserted position and which can be engaged with a ridge-like guide projection 43 which is shown in FIGS. 14 and 15.

Instead of the bellows-like recesses, the contacts 16 could also be fastened to bellows-like projections which are initially pressed outwards as a result of the overpressure but are pretensioned in such a way that, when the initial overpressure is removed, the contacts move at least partially towards the vessel cover 4. In this case, the contact elements 32 of the current supply circuit 17 could have a simpler design.

Figure 19:
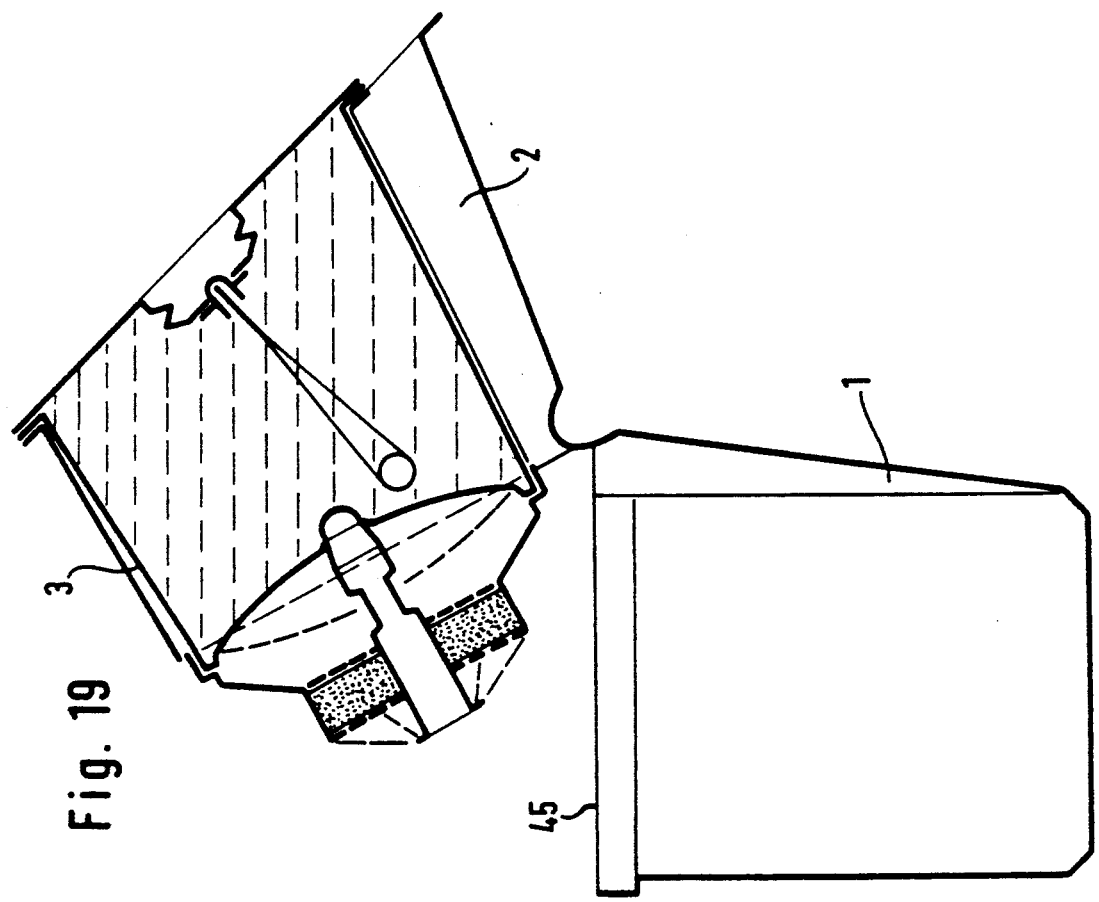
FIGS. 18 and 19 show another embodiment of the invention in two different positions.
Figure 18:
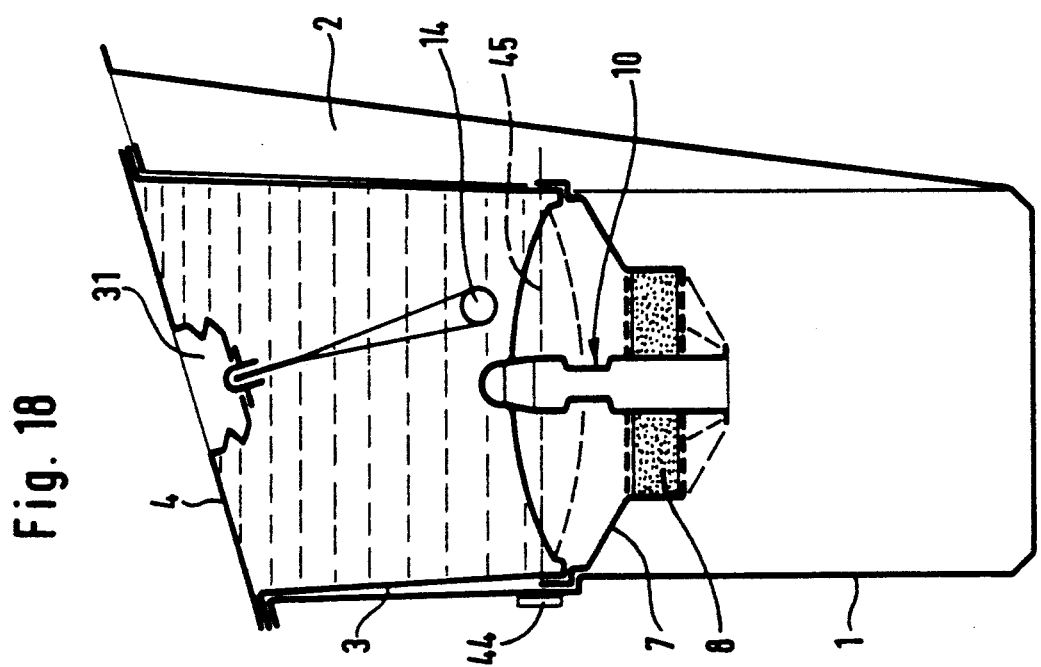

Another embodiment of the device of the invention is shown in FIGS. 18 and 19, in which the device is shown from the side in a direction perpendicular to the view in FIGS. 14 and 15. One difference as compared with the embodiment in FIGS. 14 and 15 is that the cover 4 of the storage vessel 3 is not arranged horizontally but obliquely, which has on the one hand the advantage that an air bubble can collect in the top part. On the other hand, drinking is made easier as a result and the vessel sits more securely in the support during the heating process. Furthermore, the spike 10 is not fastened to the bottom of the collecting vessel but to the vessel 7 which also bears the concentrate or infusion 8. This has the advantage that the spike 10 is moved out of the substance with the hot water added when the device is hinged open, as shown in FIG. 19. For this purpose, the device has a horizontal parting line 45 which is closed with a tear-off tape 44. After removing the tear-off tape 44, the vessel can be hinged open as in FIG. 19. If desired, the parting line 45 can be uninterrupted in a residual region so that the vessel parts remain hanging together, as shown in FIG. 19. The parting line 45 could also be continuous so that the two parts can be separated from each other.

I claim:

1. Device for preparing hot drinks having a liquid-storage vessel, an electric heating element arranged therein, a current supply circuit and a collecting vessel for the prepared drink, characterized in that the liquid-storage vessel 3 is designed as a unit separate from the current supply circuit 17 and is closed by a valve 10-13 which opens irreversibly at a predetermined pressure inside the storage vessel, the storage vessel 3 being provided with contacts 16 for the supply of electric which are connected to the heating element 14 via an electric line 15, and the storage vessel 3 being insertable into the collecting vessel 1 in an operative position in such a way that space defined by collecting vessel 1 is situated essentially below the storage vessel 3 and that the current feed to the heating element 14 is designed such that the current feed is interrupted when the valve 10-13 opens.

2. Device according to claim 1, characterized in that in the operative position of the storage vessel a storage space for a concentrate 8, closed by a filter 9, is provided blow the valve 10-13.

3. Device according to claim 2, characterized in tat the concentrate 8 is fastened in a lower region of the storage space.

4. Device according to claim 2, characterized in that the concentrate 8 is arranged in a foil bag which can be destroyed under the action of that.

5. Device according to claim 1, characterized in that the collecting vessel 1 completely encloses the storage vessel 3 in its operative position laterally and from below.

6. Device according to claim 3, characterized in that the collecting vessel 1 is provided with a lateral tubular channel 2 for removing the prepared drink.

7. Device according to claim 6, characterized in that the storage vessel is inserted fixedly into the collecting vessel 1 and the removal channel 2 includes an opening which is closed by a detachable film 27.

8. Device according to claim 6, characterized in that a seal 24 is provided adjacent the opening of the removal channel 2.

9. Device according to anyone of claims 1 to 8, characterized in that the collecting vessel 1 is provided with a flange 22 projecting laterally upwards for insertion into current supply circuit 17 and for securing the collecting vessel 1 with the storage vessel 3 being maintained therein in its operative position.

10. Device according to any one of claims 1 to 8, characterized in that the storage vessel 3 is provided with upper contacts 16.

11. Device according to any one of claims 1 to 8, characterized in that the storage vessel 3 is provided with lateral contacts 16.

12. Device according to any one of claims 1 to 8, characterized in that the current supply circuit 17 is designed as being capable of being received in a recess and is provided with a light source 21.

13. Device according to claim 1 characterized in that the valve 10-13 has a cylindrical element 10 which is surrounded by an annular seal 13 of a bottom 5 of the storage vessel 3 and which, in the operate position the storage vessel, has a region 11 with a smaller diameter, the storage vessel 3 being designed such that t its bottom 5 moves downwards with increasing pressure.

14. Device according to claim 13, characterized in that the storage vessel 3 has a side wall with an annular belllows-like region 28.

15. Device according to claim 13, characterized in that the bottom 5 is arched, pretensioned with a convex arch and deformed during filling of the storage vessel 3 into a concave arch.

16. Device according to can one of claims 1 to 8 or 13 to 15, characterized in that the current connection between the contacts 16 and the heating element 14 is interrupted when the valve 10-13 is opened.

17. Device according to any one of claims 1 to 8 or 13 to 15, characterized in hat the current line 15 from the contacts 16 to the heating element 14 has outwardly pretensioned spring elements which, when a bottom 5 of storage vessel 3 is moving downwards, can be released into a position in which the connection is interrupted.

18. Device according to claim 1, characterization that the contacts 16 are arranged in bellows-like regions 30 and move away from contact elements 32 of the current supply circuit 17 when an initial overpressure in storage vessel 3 decreases.

19. Device according to claim 18, characterized in that the contacts 16 are formed in recesses 31 arranged on a vessel cover 4 and interact with spring-loaded contact elements 32 on the current supply circuit 17 which are provided with a mechanical stop 42 to limit their movement towards the inside of the vessel.

20. Device according to claim 19, characterized in that the contact elements 32 are housed on a lever 37 which has a movable stop 41 for a vessel edge.

21. Device according to claim 1, characterized in that the current supply circuit 17 has an elastically expandable catch device for the vessel 1.

22. Device according to claim 1, characterized in that an at least partially detachable joint 44 is provided between the liquid-storage vessel 3 and the collecting vessel 1.

* * * * *

UNITED STATES PATENT AND TRADEMARK OFFICE
CERTIFICATE OF CORRECTION

PATENT NO. : 5,067,395
DATED : November 26, 1991
INVENTOR(S) : Elberhard Timm

It is certified that error appears in the above-identified patent and that said Letters Patent is hereby corrected as shown below:

Column 1, line 44, wherein the letter "0" should read --OF--.

Column 1, line 47, wherein the words "liquid storage" should read --liquid-storage--.

Column 8, line 43, wherein --current-- should be inserted after "electric".

Column 8, line 55, wherein "blow" should read --below--.

Column 8, line 56, wherein the word "tat" should read --that--.

Column 8, line 61, wherein the word "that" should read --heat--.

Column 8, line 66, wherein the number "3" should read --5--.

UNITED STATES PATENT AND TRADEMARK OFFICE
CERTIFICATE OF CORRECTION

PATENT NO. : 5,067,395

DATED : November 26, 1991

INVENTOR(S) : Elberhard Timm

It is certified that error appears in the above-identified patent and that said Letters Patent is hereby corrected as shown below:

Column 9, line 27, wherein "operate" should read --operative--; same line, after "position", insert --of--.

Column 9, line 29, wherein after "that" the letter "t" should be deleted.

Column 10, line 8, wherein the word "hat" should read --that--.

Column 10, line 14, wherein the word "characterization" should read --characterized in--.

Signed and Sealed this

Twenty-second Day of September, 1992

Attest:

DOUGLAS B. COMER

*Attesting Officer*   *Acting Commissioner of Patents and Trademarks*